(12) United States Patent  
Luo et al.

(10) Patent No.: US 10,460,701 B2  
(45) Date of Patent: Oct. 29, 2019

(54) DISPLAY MURA CORRECTION METHOD, APPARATUS, AND SYSTEM

(71) Applicant: Huawei Technologies Co., Ltd., Shenzhen, Guangdong (CN)

(72) Inventors: Honglei Luo, Shanghai (CN); Liang Xie, Shenzhen (CN); Yanfeng Liang, Shanghai (CN); Jianbo Ye, Shanghai (CN); Chunlang Pu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/559,578

(22) PCT Filed: Mar. 20, 2015

(86) PCT No.: PCT/CN2015/074749  
§ 371 (c)(1),  
(2) Date: Sep. 19, 2017

(87) PCT Pub. No.: WO2016/149877  
PCT Pub. Date: Sep. 29, 2016

(65) Prior Publication Data  
US 2018/0047368 A1 Feb. 15, 2018

(51) Int. Cl.  
*G09G 5/10* (2006.01)  
*G09G 3/20* (2006.01)  
*G09G 5/06* (2006.01)

(52) U.S. Cl.  
CPC ............ *G09G 5/10* (2013.01); *G09G 3/20* (2013.01); *G09G 5/06* (2013.01);  
(Continued)

(58) Field of Classification Search  
CPC ............ G09G 5/10; G09G 2320/0233; G09G 2320/0276; G09G 2320/0626  
See application file for complete search history.

(56) References Cited

U.S. PATENT DOCUMENTS 8,049,695 B2   11/2011 Ozawa et al.  
2005/0007364 A1*   1/2005 Oyama .................. G02F 1/1309  
                                                    345/428

(Continued)

FOREIGN PATENT DOCUMENTS

CN        1753061 A     3/2006  
CN      101114416 A     1/2008

(Continued)

*Primary Examiner* — Antonio A Caschera

(57) ABSTRACT

A display mura correction method includes: obtaining initial image data of an initial image displayed on a display of a terminal, where the initial image data includes image data of a mura region corresponding to the initial image, when at least one pixel whose brightness value is not in a reference threshold set exists in the initial image data, the mura region is a region that is covered by the at least one pixel on the display, and a target feature data set of the mura region includes a set of target feature data of the at least one pixel; obtaining, according to a correspondence between feature data and a correction value and the target feature data of the at least one pixel, a target correction value set corresponding to the target feature data set; and writing the target correction value set into the terminal.

13 Claims, 9 Drawing Sheets

(52) U.S. Cl.
CPC ........... *G09G 2320/029* (2013.01); *G09G 2320/0233* (2013.01); *G09G 2320/0276* (2013.01); *G09G 2320/0285* (2013.01); *G09G 2320/0295* (2013.01); *G09G 2320/043* (2013.01); *G09G 2320/0693* (2013.01); *G09G 2330/10* (2013.01); *G09G 2360/145* (2013.01); *G09G 2360/147* (2013.01)

(56) References Cited

U.S. PATENT DOCUMENTS

| | | | |
|---|---|---|---|
| 2006/0061593 A1 | 3/2006 | Miura et al. | |
| 2008/0238934 A1 | 10/2008 | Daly et al. | |
| 2009/0046091 A1 | 2/2009 | Arai | |
| 2010/0073526 A1 | 3/2010 | Watanabe et al. | |
| 2010/0157044 A1* | 6/2010 | Mori | G06T 7/0004 |
| | | | 348/92 |
| 2010/0171774 A1 | 7/2010 | Mizukoshi et al. | |
| 2011/0012908 A1 | 1/2011 | Daly | |
| 2013/0155042 A1 | 6/2013 | Ishikawa et al. | |
| 2013/0201180 A1 | 8/2013 | Jeon et al. | |
| 2014/0168451 A1 | 6/2014 | Lee | |
| 2014/0341467 A1 | 11/2014 | Seo | |

FOREIGN PATENT DOCUMENTS

| | | |
|---|---|---|
| CN | 101821796 A | 9/2010 |
| CN | 101003935 A | 12/2010 |
| CN | 102150197 A | 8/2011 |
| CN | 102723054 A | 10/2012 |
| CN | 103081001 A | 5/2013 |
| CN | 104159019 A | 11/2014 |
| JP | 2003131640 A | 5/2003 |
| JP | 2004062116 A | 2/2004 |
| JP | 2007178709 A | 7/2007 |
| JP | 2008250319 A | 10/2008 |
| JP | 2010002503 A | 1/2010 |
| JP | 2010050656 A | 3/2010 |
| JP | 2010-217644 A | 9/2010 |
| JP | 2011-027907 A | 2/2011 |
| KR | 10-2013-0090211 A | 8/2013 |
| WO | 2013128617 A1 | 9/2013 |

* cited by examiner

| | C1 | C2 | C3 | C4 | C5 | C6 | C7 | C8 | C9 | ... | C3240 |
|---|---|---|---|---|---|---|---|---|---|---|---|
| R1 | 100 | 100 | 100 | 100 | 100 | 100 | 100 | 100 | 100 | 100 | 100 |
| R2 | 100 | 100 | 100 | 100 | 101 | 102 | 100 | 100 | 100 | 100 | 100 |
| R3 | 100 | 100 | 96 | 102.2 | 102.2 | 101 | 101 | 100.9 | 100 | 100 | 100 |
| R4 | 100 | 100 | 97 | 102.2 | 102.2 | 101 | 100 | 101 | 100 | 100 | 100 |
| R5 | 100 | 100 | 104 | 102.2 | 102.2 | 101 | 100 | 100.7 | 100 | 100 | 100 |
| R6 | 100 | 100 | 100 | 102.1 | 102.1 | 101 | 100 | 100 | 100 | 100 | 100 |
| R7 | 100 | 100 | 100 | 100 | 104 | 104 | 100 | 100 | 100 | 100 | 100 |
| R9 | 100 | 100 | 100 | 100 | 100 | 100 | 100 | 100 | 100 | 100 | 100 |
| R10 | 100 | 100 | 100 | 100 | 100 | 100 | 100 | 100 | 100 | 100 | 100 |
| R11 | 100 | 100 | 100 | 100 | 100 | 100 | 100 | 100 | 100 | 100 | 100 |
| ... | 100 | 100 | 100 | 100 | 100 | 100 | 100 | 100 | 100 | 100 | 100 |
| R1920 | 100 | 100 | 100 | 100 | 100 | 100 | 100 | 100 | 100 | 100 | 100 |

|     | C1  | C2  | C3  | C4  | C5  | C6  | C7  | C8  | C9  | ... | C3240 |
| --- | --- | --- | --- | --- | --- | --- | --- | --- | --- | --- | --- |
| R1  | 100 | 100 | 100 | 100 | 100 | 100 | 100 | 100 | 100 | 100 | 100 |
| R2  | 100 | 100 | 100 | 100 | 100 | 100 | 100 | 100 | 100 | 100 | 100 |
| R3  | 100 | 100 | 100 | 100 | 100 | 100 | 100 | 100 | 100 | 100 | 100 |
| R4  | 100 | 100 | 100 | 100 | 100 | 100 | 100 | 100 | 100 | 100 | 100 |
| R5  | 100 | 100 | 100 | 100 | 100 | 100 | 100 | 100 | 100 | 100 | 100 |
| R6  | 100 | 100 | 100 | 100 | 100 | 100 | 100 | 100 | 100 | 100 | 100 |
| R7  | 100 | 100 | 100 | 100 | 104 | 104 | 100 | 100 | 100 | 100 | 100 |
| R8  | 100 | 100 | 100 | 100 | 100 | 100 | 100 | 100 | 100 | 100 | 100 |
| R9  | 100 | 100 | 100 | 100 | 100 | 100 | 100 | 100 | 100 | 100 | 100 |
| R10 | 100 | 100 | 100 | 100 | 100 | 100 | 100 | 100 | 100 | 100 | 100 |
| R11 | 100 | 100 | 100 | 100 | 100 | 100 | 100 | 100 | 100 | 100 | 100 |
| ... | 100 | 100 | 100 | 100 | 100 | 100 | 100 | 100 | 100 | 100 | 100 |
| R1920 | 100 | 100 | 100 | 100 | 100 | 100 | 100 | 100 | 100 | 100 | 100 |

FIG. 16

DISPLAY MURA CORRECTION METHOD, APPARATUS, AND SYSTEM

CROSS REFERENCE TO RELATED APPLICATIONS

The present application claims priority under 35 U.S.C. § 365 to International Patent Application No. PCT/CN2015/074749 filed Mar. 20, 2015 which is hereby incorporated by reference in its entirety.

TECHNICAL FIELD

The present invention relates to the field of display technologies, and in particular, to a display mura correction method, an apparatus, and a system.

BACKGROUND

In a process of producing a device with a display, the display is prone to have a mura (Mura) defect, and a mura size and the like also become more complex because mura types mainly include angular mura, cross-shaped mura, pelletized mura, arch-shaped mura, and the like. Because of main reasons causing mura, for example, a current-impedance drop (C-I Drop, Current-Impedance Drop), a non-uniform material characteristic of an organic light-emitting diode (OLED, Organnic Light Emitting Diod), a resistance-capacitance delay (Resistance-Capacitance Delay) characteristic, a bias voltage, or a squeezed or creased membrane, when the display displays an image, particularly a large-area image of a same gray, the display has non-uniform brightness, and displays the image abnormally.

In the prior art, mura is usually reduced by using a peripheral compensation commissioning system. A camera is used to photograph a solid color image displayed on a display, to obtain an image currently displayed on the display. Brightness of each pixel is analyzed, and then, a data voltage is adjusted according to an analysis result, to increase brightness of a region with relatively low brightness and decrease brightness of a region with relatively high brightness. This is repeated until expected brightness uniformity of the display is achieved. Then, correction data corresponding to brightness that exceeds a standard range is stored as a look up table (LUT, Look up table) in a storage unit. In this case, when the mura is corrected subsequently, corresponding correction data is obtained by invoking the LUT, so as to rectify a mura phenomenon of the display.

However, the peripheral compensation commissioning system needs to adjust a voltage repeatedly for multiple times, thereby leading to low correction efficiency, and the peripheral compensation commissioning system has a large volume and a complex structure.

SUMMARY

The present invention provides a display mura correction method, an apparatus, and a system, so as to resolve a prior-art problem that display mura is difficult to correct.

A first aspect of the present invention provides a display mura correction method, including:

obtaining, by a terminal, initial image data of an initial image displayed on a display of the terminal, where the initial image data includes image data of a mura region corresponding to the initial image, and when at least one pixel whose brightness value is not in a reference threshold set exists in the initial image data, the mura region is a region that is covered by the at least one pixel on the display;

determining, by the terminal, a target feature data set of the mura region, where the target feature data set includes a set of target feature data of the at least one pixel;

obtaining, by the terminal according to a correspondence between feature data and a correction value and the target feature data of the at least one pixel, a target correction value set corresponding to the target feature data set; and writing, by the terminal, the target correction value set into the terminal, so that the terminal corrects the mura region according to the target correction value set.

With reference to the first aspect, in a first implementation manner of the first aspect of the present invention, the correspondence is look up tables LUTs that include correspondence sets between n groups of feature data and correction values, where n is a positive integer greater than 1, there are multiple LUTs, and after the writing the target correction value set into the terminal, the method further includes:

after preset duration, determining, according to a current brightness attenuation value of the display, a target LUT corresponding to the brightness attenuation value, and updating a currently used LUT to the target LUT, where the LUT and the brightness attenuation value are in a one-to-one correspondence.

With reference to the first implementation manner of the first aspect, in a second implementation manner of the first aspect of the present invention, the mura region includes multiple target mura regions, and the obtaining, according to a correspondence between feature data and a correction value and the target feature data of the at least one pixel, a target correction value set corresponding to the target feature data set, and the writing the target correction value set into the terminal specifically include:

obtaining a target correction value corresponding to each of the multiple target mura regions from the LUT, to obtain the target correction value set; and writing the target correction value set into the terminal, so that after determining a priority of each of the multiple target mura regions, the terminal corrects a pixel in each mura region in descending order of the priorities according to the target correction value set, to obtain corrected target image data.

With reference to the first aspect and the first and the second implementation manners of the first aspect, in a third implementation manner of the first aspect of the present invention, after the writing the target correction value set into the terminal, the method further includes: obtaining a target grayscale coefficient of the mura region that has undergone compensation processing;

comparing the target grayscale coefficient with a preset grayscale coefficient of a normal region to obtain a comparison result; and when it is determined that the comparison result does not meet a preset correction acceptance condition, repeating a correction process until the preset correction acceptance condition is met, and writing a correction value set obtained when the correction acceptance condition is met into the terminal to update the target correction value set.

With reference to the first to the third implementation manners of the first aspect, in a fourth implementation manner of the first aspect of the present invention, the obtaining a target correction value corresponding to each of the multiple target mura regions from the LUT, to obtain the target correction set specifically includes:

determining, according to the LUT, a numerical interval corresponding to each mura region, and selecting, according to a preset selection policy, the target correction value corresponding to each mura region, to obtain the target correction value set.

A second aspect of the present invention provides an image adjustment apparatus, where the apparatus includes:

a receiving module, configured to receive initial image data of an initial image displayed on a display of a terminal, where the initial image data includes image data of a mura region corresponding to the initial image, and when at least one pixel whose brightness value is not in a reference threshold set exists in the initial image data, the mura region is a region that is covered by the at least one pixel on the display;

a determining module, configured to determine a target feature data set of the mura region according to the initial image data received by the receiving module, where the target feature data set includes a set of target feature data of the at least one pixel;

a processing module, configured to obtain, according to a correspondence between feature data and a correction value and the target feature data that is of the at least one pixel and is determined by the determining module, a target correction value set corresponding to the target feature data set; and a writing module, configured to write the target correction value set obtained by the processing module into the terminal, so that the terminal corrects the mura region according to the target correction value set.

With reference to the second aspect, in a first implementation manner of the second aspect of the present invention, the apparatus further includes:

a correction module, configured to correct the mura region according to the target correction value set written by the writing module, to obtain target image data; and an output module, configured to output a target image corresponding to the target image data obtained by means of correction by the processing module.

With reference to the first implementation manner of the second aspect, in a second implementation manner of the second aspect of the present invention, the correspondence is look up tables LUTs that include correspondence sets between n groups of feature data and correction values, where n is a positive integer greater than 1, there are multiple LUTs, and the apparatus further includes:

an updating module, configured to: after preset duration, determine, according to a current brightness attenuation value of the display, a target LUT corresponding to the brightness attenuation value, and update a currently used LUT to the target LUT, where the LUT and the brightness attenuation value are in a one-to-one correspondence.

With reference to the second implementation manner of the second aspect, in a third implementation manner of the second aspect of the present invention, the receiving module is specifically configured to obtain the mura region of the initial image data, where the mura region of the initial image data includes multiple target mura regions;

the processing module is specifically configured to:

obtain a target correction value corresponding to each of the multiple target mura regions from the LUT, to obtain the target correction value set;

the apparatus further includes:

an obtaining module, configured to obtain a priority of each of the multiple target mura regions; and the processing module is further configured to correct a pixel in each mura region in descending order of the priorities obtained by the obtaining module.

With reference to the second aspect and the first to the third implementation manners of the second aspect, in a fourth implementation manner of the second aspect of the present invention, the obtaining module is further configured to obtain a target grayscale coefficient of the mura region that has undergone compensation processing;

the apparatus further includes:

a comparison module, configured to compare the target grayscale coefficient with a preset grayscale coefficient of a normal region to obtain a comparison result; and the processing module is further configured to: when it is determined that the comparison result obtained by the comparison module does not meet a preset correction acceptance condition, repeat a correction process until the preset correction acceptance condition is met.

With reference to the first to the fourth implementation manners of the second aspect, in a fifth implementation manner of the second aspect of the present invention, the processing module is further configured to:

determine, according to the LUT, a numerical interval corresponding to each mura region; and select, according to a preset selection policy, a target correction value corresponding to each mura region.

A third aspect of the present invention provides a communications terminal, including:

a video decoder, a memory, a direct memory access DMA controller, and a processor, where the video decoder is configured to decode initial image data input into the communications terminal, where the initial image data includes image data of a mura region, and when at least one pixel whose brightness value is not in a reference threshold set exists in the initial image data, the mura region is a region that is covered by the at least one pixel on the display;

the memory is configured to store a correspondence between feature data and a correction value;

the DMA controller is configured to: in a phase in which the video decoder decodes the initial image data, when the processor sends a query request to the DMA controller so as to correct the mura region, send data including the correspondence obtained from the memory to the processor, where the query request is a request for querying a target correction value set corresponding to the target feature data set; and the processor is configured to: determine the target feature data set of the mura region according to the initial image data obtained by means of decoding by the video decoder, where the target feature data set includes a set of target feature data of the at least one pixel; obtain, according to the correspondence sent by the DMA controller and the target feature data of the at least one pixel, the target correction value set corresponding to the target feature data set; and write the target correction value set into the memory, so as to correct the mura region according to the target correction value set.

With reference to the third aspect, in a first implementation manner of the third aspect of the present invention, the correspondence is look up tables LUTs that include correspondence sets between n groups of feature data and correction values, where n is a positive integer greater than 1, there are multiple LUTs, and the processor is further configured to:

after preset duration, determine, according to a current brightness attenuation value of the display, a target LUT corresponding to the brightness attenuation value, and update an LUT currently stored in the memory to the target LUT, where the LUT and the brightness attenuation value are in a one-to-one correspondence.

The processor is specifically configured to: when the mura region includes multiple target mura regions, perform a query in the LUT to obtain a target correction value corresponding to each of the multiple target mura regions, to obtain the target correction value set; and with reference to the first implementation manner of the third aspect, in a second implementation manner of the third aspect of the present invention, after a priority of each of the multiple target mura regions is determined, correct a pixel in each mura region in descending order of the priorities by using the target correction value set.

A fourth aspect of the present invention provides a display mura correction system, including:

the communications terminal according to any one of the third aspect of the present invention, or the first or the second implementation manner of the third aspect.

It may be learned from the foregoing technical solutions that in the present invention, after target feature data corresponding to a mura region of initial image data is obtained, a target correction value set corresponding to the target data is obtained according to a correspondence between feature data and a correction value, thereby improving correction value accuracy; and the target correction value set is written into the terminal, and the mura region is corrected according to the target correction value, thereby lowering display mura correction difficulty.

BRIEF DESCRIPTION OF THE DRAWINGS

FIG. 16 is shown that exceeds the preset threshold is corrected separately.

DETAILED DESCRIPTION

Figure 1:
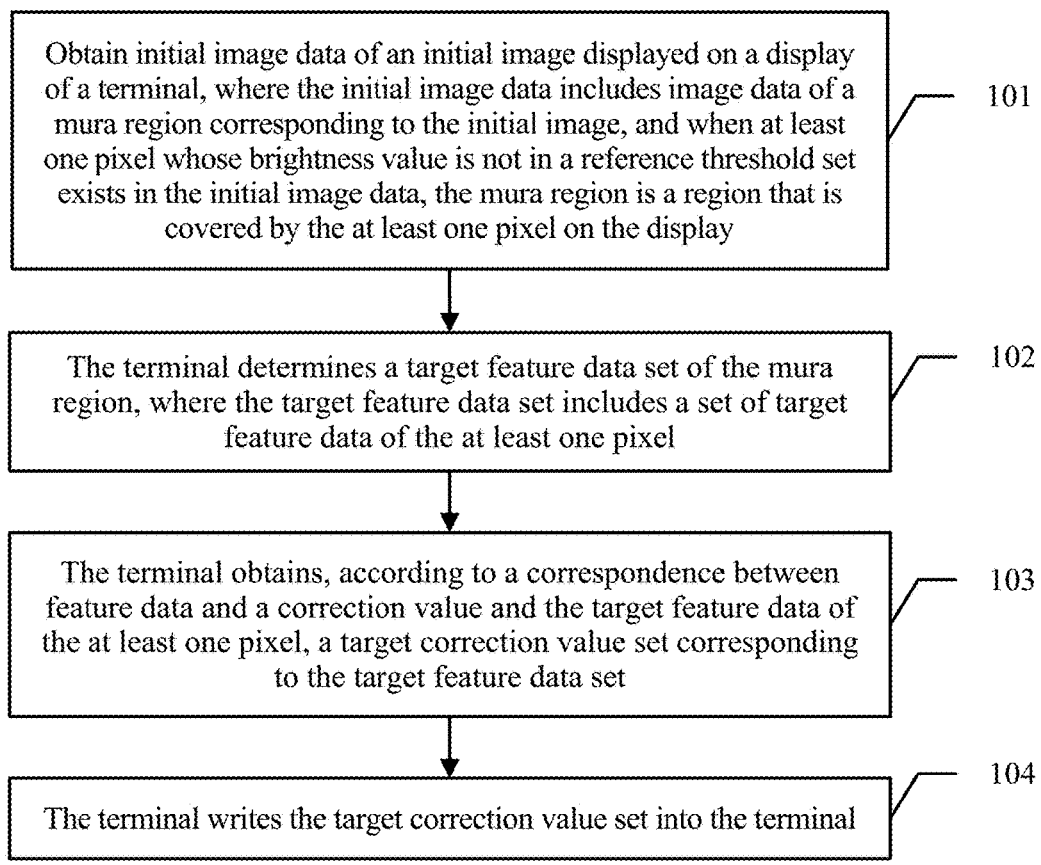
FIG. 1 is a schematic diagram of an embodiment of a display mura correction method according to the embodiments of the present invention.

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", and the like are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

The embodiments of the present invention provide a display mura correction method, an apparatus, and a system that are mainly used for correcting display mura, and can resolve a prior-art problem that a mura correction device has a large volume, low integration, and low correction accuracy, and is inconvenient to use. A display device in the specification may be a mobile phone, a tablet computer, a splicing wall, or any device with a display.

It should be noted that a grayscale in the specification is a pixel, that is, a point that people see with naked eyes on a display. The point includes three subpixels: red, green, and blue (RGB) subpixels. A light source at each subpixel can present different brightness levels. The grayscale represents different brightness levels from the darkest to the brightest. More intermediate levels lead to a finer image effect. An 8-bit panel is used as an example. The 8-bit panel can present $2^8$, that is, 256 brightness levels, and the 256 brightness levels are called 256 grayscales, that is, a color change of each point on a display is caused by grayscale changes of three subpixels RGB forming the point.

It should be noted that the embodiments of the present invention are applicable to mura correction of active display devices such as a display and a liquid crystal display (LCD, Liquid Crystal Display) that are made of active-matrix organic light-emitting diodes (AMOLED, Active-matrix organic light-emitting diode). This is not specifically limited in the specification.

The following describes a display mura correction method in an embodiment. A terminal includes an application processor (AP, Application Processor), an image processor, and a memory for storing an LUT. Referring to FIG. 1, the embodiment of the display mura correction method in the embodiments of the present invention includes the following steps.

101. The terminal receives initial image data of an initial image displayed on a display of the terminal, where the initial image data includes image data of a mura region corresponding to the initial image, and when at least one pixel whose brightness value is not in a reference threshold set exists in the initial image data, the mura region is a region that is covered by the at least one pixel on the display.

Figure 5:
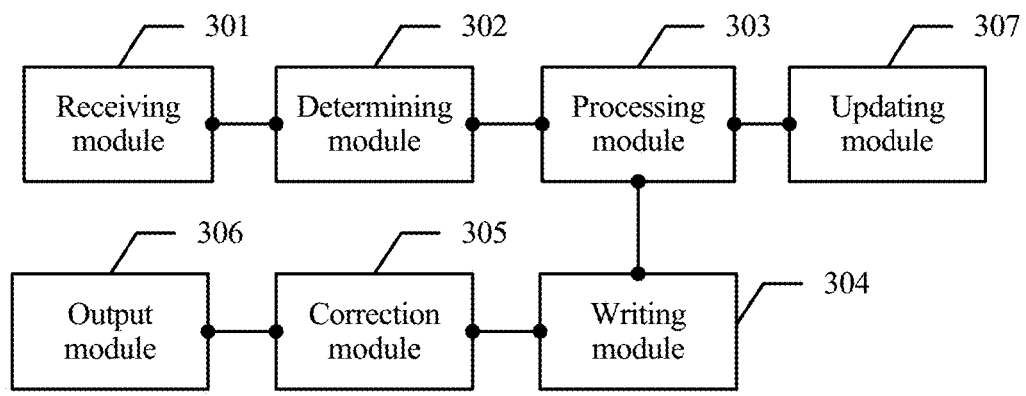
FIG. 5 is another schematic structural diagram of an image adjustment apparatus according to an embodiment of the present invention.

In an actual application, the initial image data may be sent by a peripheral test system. The peripheral test system includes a test mode generation apparatus, a camera apparatus, and an image adjustment apparatus (as shown in FIG. 5). A manner of obtaining the initial image data by the peripheral test system is as follows:

First, the test mode generation apparatus in the peripheral test system generates multiple test images required by the display, and the camera apparatus photographs images on the display, that is, initial image, for example, grayscale images with R, G, and B subpixels of 0, 31, 63, 127, 191, 223, and 255 grayscales, and then transmits the grayscale images to the image adjustment apparatus. The image adjustment apparatus uses an image collection module including a charge-coupled device image sensor (CCD, Charge Coupled Device) and an optical cavity to sample the grayscale images, so as to collect initial image data of the display, and then the image adjustment apparatus determines, according to the initial image data, a mura region causing displaying mura of the display, and marks the mura region. Specific marking operations may be thickening, coloring, shadowing, drawing a curve circle, or the like, provided that the mura region can be distinguished. This is not specifically limited.

After obtaining, according to the foregoing step, the initial image data including the marked mura region, the peripheral test system transmits the initial image data to the terminal, so that the terminal can receive the initial image data.

The following is a process in which the image adjustment apparatus determines the mura region.

(1) The image adjustment apparatus compares the initial image data with a preset reference threshold set. The reference threshold set includes multiple reference thresholds.

That is, each brightness value in feature data is compared with a corresponding reference threshold. The initial image data includes feature data of multiple pixels. The feature data includes a brightness value, pixel coordinates, and the like; or may include spectral feature data, geometric feature data, time phase feature data, and the like, or a histogram feature, a gray edge feature, a line, angle, or point feature, a texture feature, and the like.

The reference threshold set may be in a matrix form. For example, the reference threshold set includes a correspondence between pixel coordinates and a reference threshold, and the like. A reference threshold corresponding to a pixel may be determined according to a physical position of the pixel on the display, that is, pixel coordinates, and this is not specifically limited. In addition, the reference threshold set is used for checking whether the initial image data falls within a normal range. Brightness values are corresponding to different reference thresholds. A same reference threshold is applicable to pixels on a same physical position of displays of a same type of display devices.

(2) A region covered by a pixel whose brightness value is not in the reference threshold is determined as a candidate mura region.

In an actual application, a specific manner of determining the candidate mura region is at least the following:

A brightness value of each pixel is compared with a reference threshold, and if there is a pixel whose brightness value is not in a corresponding reference threshold, it is determined that the brightness value of the pixel is unqualified. The same is true of another pixel. Finally, at least one pixel that falls beyond a preset reference threshold set range is obtained, and continuous physical positions occupied by the at least one pixel on the display are set as the candidate mura region according to the physical positions of the at least one pixel on the display. There may be multiple candidate mura regions.

(3) A target mura region is determined from the multiple candidate mura regions.

First, feature information corresponding to each candidate mura region is extracted. A candidate mura region whose feature information that exceeds a standard range is determined as the target mura region (a mura region that needs to be corrected). Specific feature information includes information such as an area, a shape, a size, or a position of the mura region. Specifically, alternatively, the target mura region that needs to be corrected in the candidate mura regions may be determined according to areas or shapes of the mura regions, and the target mura region is marked. The target mura region finally obtained is the mura region described in the foregoing step 101.

In addition, a standard range for determining the target mura region is set by a manufacturer that produces a display device. Manufacturers have different standards for product quality, such as an area, a shape, a size, or a position.

102. The terminal determines a target feature data set of the mura region, where the target feature data set includes a set of target feature data of the at least one pixel.

The target feature data set includes at least one piece of target feature data. Each piece of target feature data is corresponding to one pixel. The pixel is a pixel whose brightness value is not in the reference threshold, that is, a to-be-corrected pixel.

103. The terminal obtains, according to a correspondence between feature data and a correction value and the target feature data of the at least one pixel, a target correction value set corresponding to the target feature data set.

The target correction value set includes a target correction value corresponding to each pixel in the mura region. The target correction value set includes at least one target correction value, and a specific quantity is determined according to the pixels in the mura region. Each target correction value includes coordinate data, a brightness correction value, and the like that are corresponding to a pixel.

The correspondence between feature data and a correction value may be expressed in a form of an LUT. The LUT includes a correspondence between multiple groups of feature data and correction values. The LUT may be invoked locally, or may be obtained from a peripheral image adjustment apparatus, by using a network, or the like, and a specific implementation manner is not limited in the specification.

In an actual application, a specific LUT generation manner is as follows:

A band-pass filter performs band-pass filtering (high-frequency component removal) on initial image data, and generates band-pass data. Then, a process management part calculates a correction value corresponding to the band-pass data, repeats this correction value calculation process to obtain correction values corresponding to different grayscale images, and generates an image correction table, that is, an LUT, for inverting the band-pass data (for example, transposing a matrix). The LUT includes three types of image correction values corresponding to an R signal, a G signal, and a B signal. The terminal performs corresponding correction on RGB data of the initial image data according to the three types of image correction values, so as to inhibit color mura.

In the prior art, the target correction value set can be obtained only by a peripheral compensation system with a large volume, and when a substantial quantity of terminals with displaying mura exist, the peripheral compensation system has relatively heavy processing load, and cannot necessarily process every terminal accurately. A correction process can be completed only by depending on the peripheral compensation system. If the peripheral compensation system is faulty, a correction process cannot be performed, and therefore, production efficiency is lowered. In the present invention, only a peripheral test device (for example, an image adjustment apparatus. The image adjustment apparatus does not need to have a mura compensation function, thereby effectively lowering device costs) is required to transmit the initial image data including the mura region to the terminal, and the terminal subsequently performs mura correction processing by itself. In the present invention, only a built-in image processor of the terminal is required to complete a correction operation, thereby effectively improving integration of a display mura correction system.

104. The terminal writes the target correction value set into the terminal.

Figure 11:
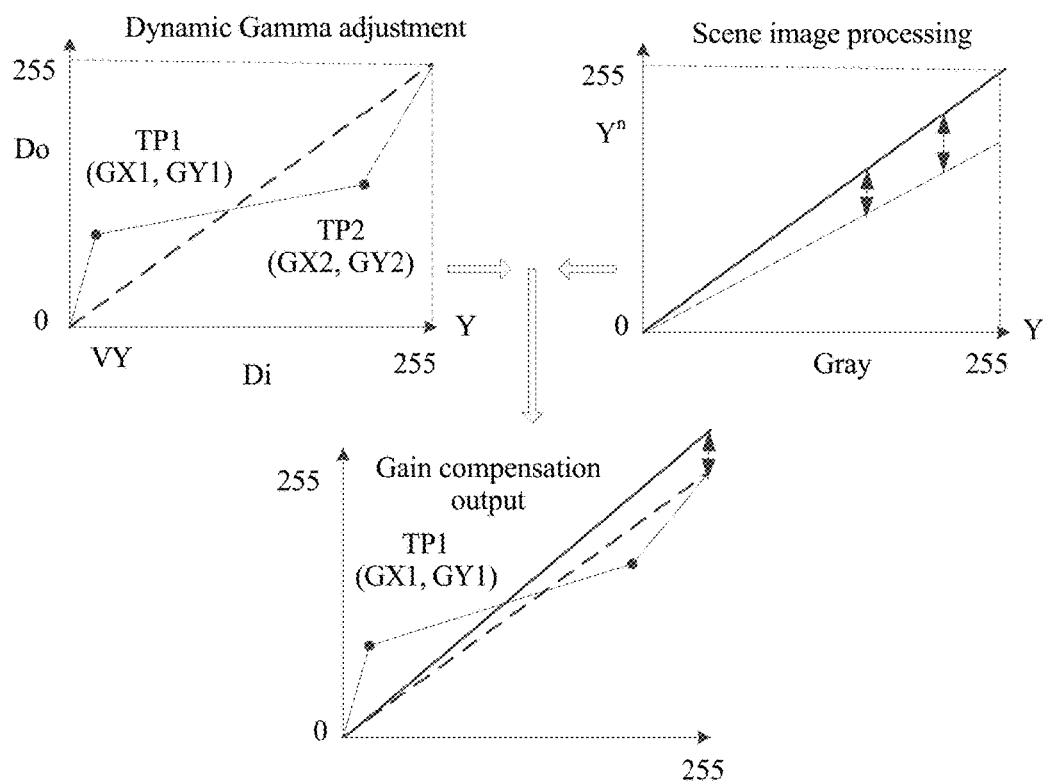
FIG. 11 is a schematic curve diagram of a mura correction process according to an embodiment of the present invention.
Figure 12:
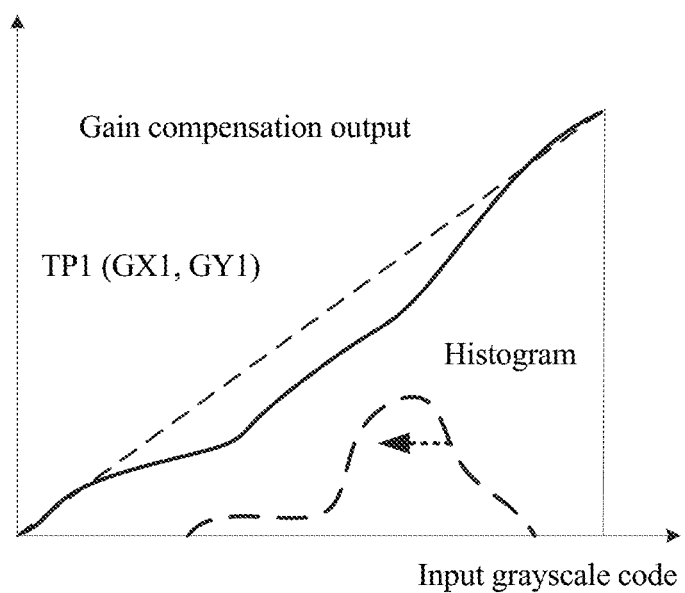
FIG. 12 is a schematic curve diagram of an output signal of a display after mura correction according to an embodiment of the present invention.

Specifically, the target correction value set is written into the terminal, so that the terminal corrects the mura region according to the target correction value set, to obtain target image data, performs image sharpening, dynamic grayscale gamma adjustment of an image tone (as shown in FIG. 11), and color enhancement processing on the target image data, and then outputs the target image data to the display (as shown in FIG. 12), to display a target image corresponding to the target image data, that is, to adjust an output image of the display of the terminal. During specific correction, an input image value of each pixel is corrected according to the target correction value set, so as to weaken or eliminate a displaying mura phenomenon.

Corrected image data is output to a digital signal processor for processing, so as to convert processed image data into an image signal of a standard format such as GRB or YUV.

It may be understood that if a gray value, that is, a brightness value of the mura region is greater than a reference threshold, a target correction value is negative, so as to eliminate or alleviate an impact caused by the case in which the brightness value is greater than the reference threshold, and vice versa.

For example, if the gray value is greater than the reference threshold, brightness needs to be decreased, that is, the grayscale value needs to be reduced; or if the gray value is less than the reference threshold, brightness is increased to compensate for brightness mura of the display.

In this embodiment of the present invention, after a target feature data set corresponding to a mura region of initial image data is obtained, a target correction value set corresponding to the target feature data set is obtained according to a correspondence between feature data and a correction value, thereby improving correction value accuracy; and the target correction value set is written into the terminal, so that the terminal corrects the mura region according to the target correction value set, and displays a target image corresponding to target image data. Mura correction can be completed directly by using a built-in image processor of the terminal, without a need of an external peripheral compensation system, thereby lowering display mura correction difficulty, and lowering production costs.

Optionally, on the basis of the embodiment corresponding to FIG. 1, in a first optional embodiment of the embodiments of the present invention, the correspondence includes multiple LUTs, and the LUTs are correspondence sets including n groups of feature data and correction values, where n is a positive integer greater than 1. After the terminal writes the target correction value set into the terminal, the method further includes:

after preset duration, determining, by the terminal according to a current brightness attenuation value of the display, a target LUT corresponding to the brightness attenuation value, and updating a currently used LUT to the target LUT, where the LUT and the brightness attenuation value are in a one-to-one correspondence.

It may be understood that with use of the terminal, an internal circuit structure or a material of the terminal may affect a display result of the display. For example, a drive voltage, material aging, long-term squeezing imposed on the display, or the like causes new mura. This is not specifically limited in the specification.

It should be noted that, if it is time to replace an LUT next time, when a brightness attenuation value of the display does not reach an expected attenuation value (for example, the display is unused for a long time, and consequently, a mura phenomenon of the display is unapparent), or exceeds an expected attenuation value (for example, the display is overused, the material ages, or the like, and consequently, new mura is more serious than expected), a corresponding LUT only needs to be determined according to a current brightness attenuation value.

Examples are shown in Table 1.

TABLE 1

| Duration $T_n$ | Brightness attenuation value $X_n$ | $LUT_n$ |
|---|---|---|
| $T_1$ | $X_1$ | $LUT_1$ |
| $T_2$ | $X_2$ | $LUT_2$ |
| $T_3$ | $X_3$ | $LUT_3$ |

The terminal stores three LUTs. At $T_2$, a brightness attenuation value of the display is $X_3$, but an expected brightness attenuation value is $X_2$. In this case, $LUT_3$ corresponding to the current brightness attenuation value $X_3$ needs to be selected to replace a current LUT, so as to correct current new mura.

It should be noted that, in the prior art, mura correction can be performed on the display of the terminal only when the display is produced or repaired later. However, after a user purchases the terminal, if new mura occurs or correction of old mura is affected by a drive voltage, an external force, a material, or the like after the terminal is used for a period of time, the display of the terminal cannot display properly with a correction value before delivery, and in this case, the terminal cannot perform adaptive post-correction by itself.

In this embodiment of the present invention, when it is determined that an image currently displayed on the display is different from an image displayed last time (for example, different applications APPs may affect a displayed image), and when the current image has a mura region, a correction value set corresponding to the mura region of the current image is obtained by performing a query in the LUT adaptively, and adaptive correction is performed to adjust the current image; or when it is detected that a current operating system of the terminal changes, the current image is adjusted adaptively.

Changes of the operating system changes include at least the following several cases:

updating of the current operating system, for example, upgrading, or a change of a type of the current operating system, for example, replacement of an Android system with a Window system. This is not specifically limited in the specification.

Optionally, on the basis of the embodiment corresponding to FIG. 1 and the first optional embodiment, in a second optional embodiment of the embodiments of the present invention, the mura region includes multiple target mura regions, and that the target correction value set corresponding to the target feature data set is obtained according to the correspondence between feature data and a correction value and the target feature data of the at least one pixel, and that the target correction value set is written into the terminal specifically include:

obtaining, by the terminal, the mura region of the initial image data, where the mura region of the initial image data includes multiple target mura regions;

obtaining a target correction value corresponding to each of the multiple target mura regions from the LOT, to obtain the target correction value set; and then writing the target correction value set into the terminal, so that after determining a priority of each of the multiple target mura regions, the terminal corrects a pixel in each mura region in descending order of the priorities according to the target correction value set, to obtain corrected target image data. Mura is corrected by region, so that correction is better targeted, a correction effect is improved, a quantity of correction times and a correction time are reduced, mura correction accuracy is improved, and display quality is effectively improved.

Correction values in the correspondence sets change by gradient, for example, ascend or descend by gradient. This is obtained by a developer by means of a large quantity of tests.

It may be understood that the priority of the mura region may be defined according to a size, a shape, a type of the mura region, or a similar feature such as a position of the mura region on the display, and this is not specifically limited in the specification.

Optionally, on the basis of the embodiment corresponding to FIG. 1 and the first optional embodiment, in a third optional embodiment of a display mura correction method provided in the embodiments of the present invention, after the terminal obtains the mura region of the initial image data, and before the terminal obtains, according to the correspondence between feature data and a correction value, the target correction value set corresponding to the target feature data set, the method further includes:

obtaining the LUT that is configured locally in advance; or receiving the LUT sent by an image adjustment apparatus.

It may be understood that the LUT may be configured by the image adjustment apparatus in advance, or may be obtained from a network or a database or in another similar manner and then locally stored, provided that the LUT can be invoked rapidly when mura correction is being performed. Neither a specific obtaining manner nor a time sequence is limited in the specification.

Optionally, on the basis of the embodiment corresponding to FIG. 1, and the first or the second optional embodiment, in a third optional embodiment of the display mura correction method provided in the embodiments of the present invention, after the target correction value set is written into the terminal, the method further includes:

obtaining, by the terminal, a target grayscale coefficient of the mura region that has undergone compensation processing;

comparing the target grayscale coefficient with a preset grayscale coefficient of a normal region to obtain a comparison result; and when it is determined that the comparison result does not meet a preset correction acceptance condition, repeating, by the terminal, a correction process (referring to step 102) until the preset correction acceptance condition is met, and writing a correction value set obtained when the correction acceptance condition is met into the terminal to update the target correction value set.

In an actual application, an implementation manner of comparing the target grayscale coefficient with the preset grayscale coefficient of the normal region is as follows:

A difference or a ratio between the target grayscale coefficient and the preset grayscale coefficient of the normal region is calculated; and when the difference exceeds a preset first threshold range or the ratio exceeds a preset second threshold range, it is determined that the mura region does not meet the preset correction acceptance condition, and the correction process is repeated until the preset correction acceptance condition is met.

It should be noted that examples of the difference and the ratio are merely shown herein, but another similar implementation manner is not limited.

Optionally, on the basis of the embodiment corresponding to FIG. 1, and the first, the second, or the third optional embodiment, in a fourth optional embodiment of the display mura correction method provided in the embodiments of the present invention, that the target correction value corresponding to each of the multiple target mura regions is obtained from the LUT specifically includes:

determining, by the terminal according to the LUT, a numerical interval corresponding to each mura region, and selecting, according to a preset selection policy, the target correction value corresponding to each mura region.

The preset selection policy may include a preset lower-limit selection policy or a preset closeness-based selection policy.

When the target correction value is being selected, the terminal may select, according to the preset lower-limit selection policy, the target correction value corresponding to each mura region. For example, when the LUT is a matrix, a numerical interval within which pixel data corresponding to each mura region falls is determined first; then, target image data, that is, closest image data, that is corresponding to the pixel data and that is in the LUT table is determined according to the lower-limit selection policy; and the target correction value corresponding to the mura is determined. For example, $M_{n-1} < M_x < M_n$, and provided that $M_x$ falls within $[M_{n-1}, M_n]$, $W_{n-1}$ corresponding to $M_{n-1}$ is selected.

Alternatively, the target correction value corresponding to each mura region may be selected according to the preset closeness-based selection policy. For example, $M_{n-1}<M_x<M_n$. If a value of $M_x$ is close to $M_n$, $W_n$ corresponding to $M_n$ is selected; or if a value of $M_x$ is close to $M_{n-1}$, $W_{n-1}$ corresponding to $M_{n-1}$ is selected.

For example, when the LUT is a matrix, a numerical interval within which pixel data corresponding to each mura region falls is determined first; then, target image data, that is, closest image data, that is corresponding to the pixel data and that is in the LUT table is determined according to the lower-limit selection policy; and the target correction value corresponding to the mura is determined.

In addition, a correspondence that is between a correction value and feature data and is obtained by means of a large quantity of tests is preset in a display device or an image processing apparatus (as shown in the following Table 2). In this case, when an image is photographed, a target correction value corresponding to a mura region can be determined by testing the correspondence.

Table of a correspondence between a correction value and feature data

TABLE 2

| Correction value $W_x$ | Feature data $M_x$ |
|---|---|
| $W_1$ | $M_1$ |
| $W_2$ | $M_2$ |
| ... | ... |
| $W_n$ | $M_n$ |

It should be noted that the LUT may be data in a matrix form, an array form, or another similar form of expression. This is not specifically limited in the specification.

Figure 2:
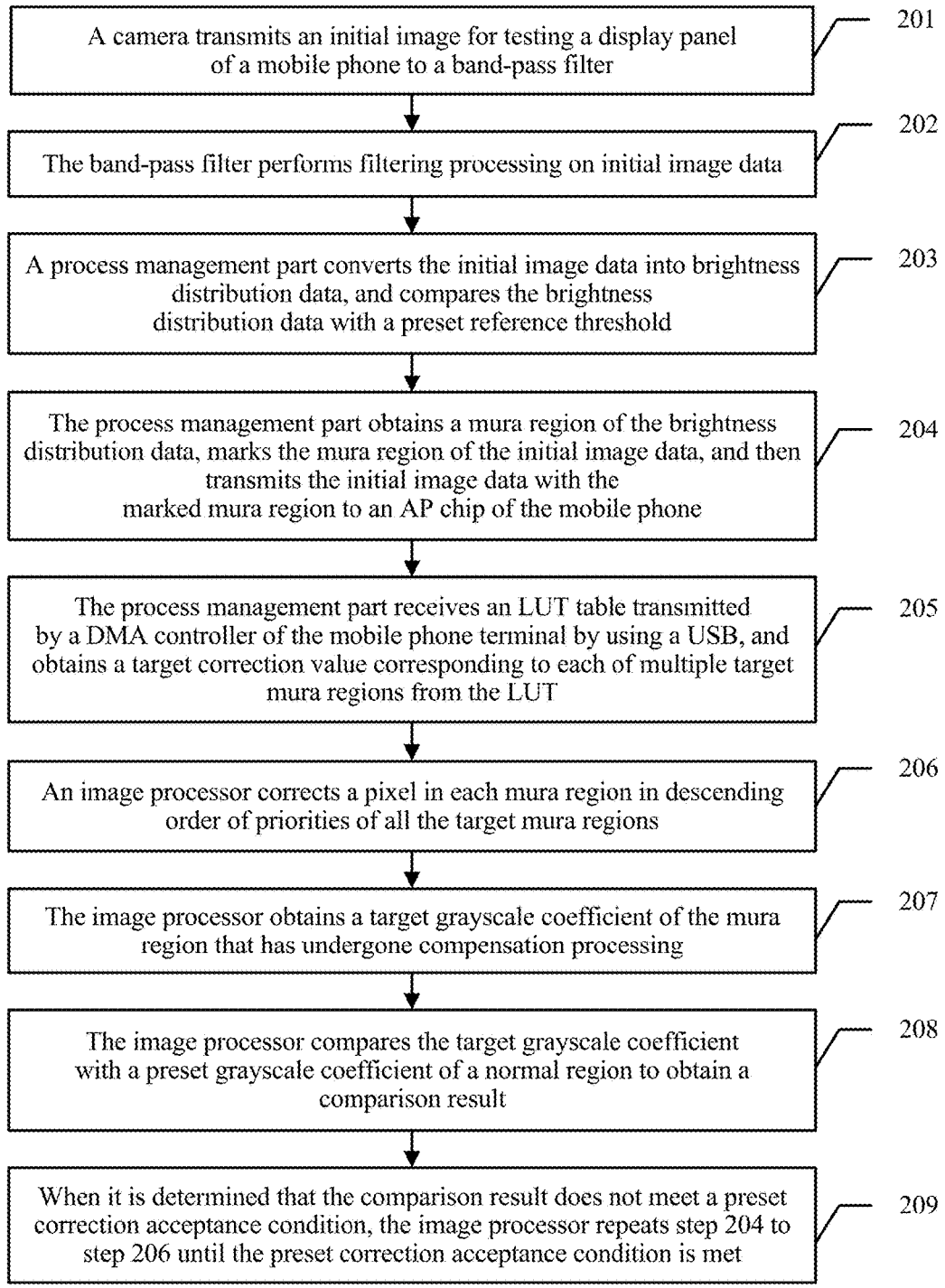
FIG. 2 is a schematic diagram of an embodiment of a display mura correction method according to the embodiments of the present invention.

For ease of understanding, the following describes the display mura correction method in the embodiments of the present invention by using a specific application scenario. For example, a mobile phone corrects mura on a display of the mobile phone. An LUT is preset in an AP chip of the mobile phone. The AP chip of the mobile phone includes an application processor layered driver interface (AP LDI, Application Processor Layered Driver Interface) module and an image processor. The AP LDI module includes a video decoder and encoder, a video decoder, and a direct memory access (DMA, Direct Memory Access) controller. Referring to FIG. 2 and FIG. 5, an embodiment of the present invention includes the following steps.

201. A camera apparatus transmits initial image data for testing the display of the mobile phone to a band-pass filter.

202. The band-pass filter performs filtering processing on the initial image data.

203. A process management part converts the initial image data into brightness distribution data, and compares the brightness distribution data with a preset reference threshold.

Generally, 8*8 pixels or 4*4 pixels are used as a unit for the brightness distribution data, and this is not specifically limited in the specification.

204. The process management part obtains a mura region of the brightness distribution data, marks the mura region of the initial image data, and then transmits the initial image data with the marked mura region to the AP chip of the mobile phone.

The mura region of the brightness distribution data includes multiple target mura regions.

Figures 14, 15:
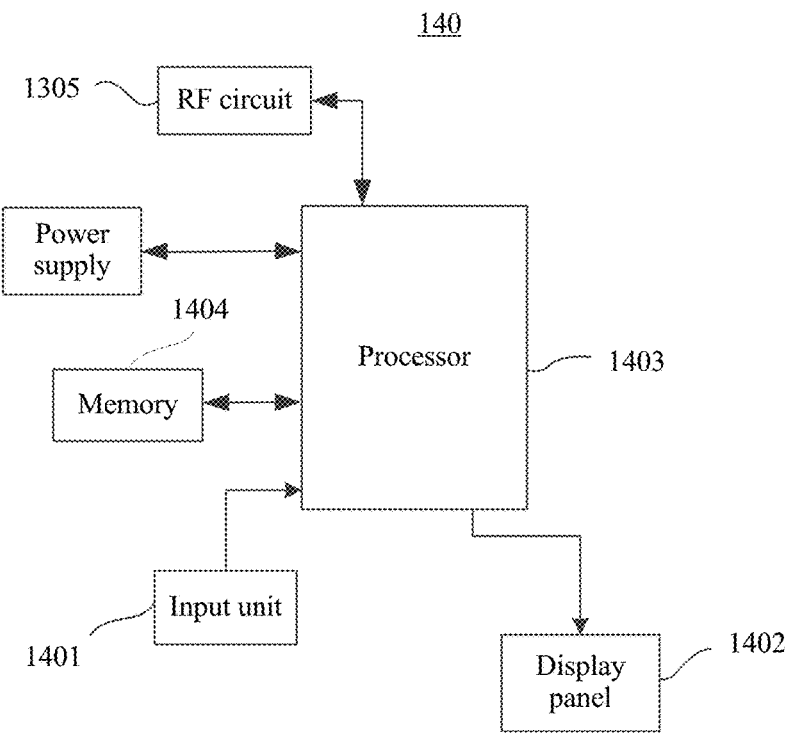
FIG. 14 is a schematic diagram of a physical structure of an image adjustment apparatus according to an embodiment of the present invention.
FIG. 15 is a data in a curved region is brightness distribution data corresponding to a target mura region.

As shown in FIG. 15, data in a curved region 1501 is brightness distribution data corresponding to a target mura region.

205. The image processor receives an LUT table transmitted by the DMA controller, and obtains a target correction value set corresponding to the mura region from the LUT.

That is, a target correction value corresponding to each of the multiple target mura regions is obtained.

For example, $M_3=(R_3, C_3)$, and it is learned by performing a query in Table 1 that a target correction value corresponding to $M_3$ is $W_3$. $W_3=4$ in an actual test. Likewise, $M_4=(R_4, C_4)$, and corresponding $W_4=-2.2$, and so on.

206. The image processor corrects a pixel in each mura region in descending order of priorities of all the target mura regions.

Data obtained after the data, in the curve 1601 in FIG. 15, that exceeds the preset threshold is corrected separately is shown in FIG. 16.

Specifically, the image processor may first determine a priority of each of the multiple target mura regions, and then separately correct the multiple target mura regions according to the priorities, for example, in descending order of mura areas, or according to shapes (correction is separately performed in a left-right order of cross-shaped mura, angular mura, arch-shaped mura, to pelletized mura). A specific correction order is based on an actual product test criterion, provided that a related test criterion can be reached during a product test. This is not limited in the specification.

207. The image processor obtains a target grayscale coefficient of the mura region that has undergone compensation processing.

208. The image processor compares the target grayscale coefficient with a preset grayscale coefficient of a normal region to obtain a comparison result.

209. When it is determined that the comparison result does not meet a preset correction acceptance condition, the image processor repeats step 204 to step 206 until the preset correction acceptance condition is met.

In this embodiment of the present invention, multiple target mura regions of the initial image data are received, and the multiple target mura regions are corrected by region, so that correction is better targeted, a correction effect is improved, and a quantity of correction times and a correction time are reduced. Mura correction can be completed directly by using a built-in image processor of a mobile phone, without a need of an external peripheral compensation system, thereby lowering display mura correction difficulty, and lowering production costs. In addition, after each time of correction, correction acceptance check is performed on corrected target image data, thereby effectively improving mura correction accuracy, and improving a product yield.

Figure 3:
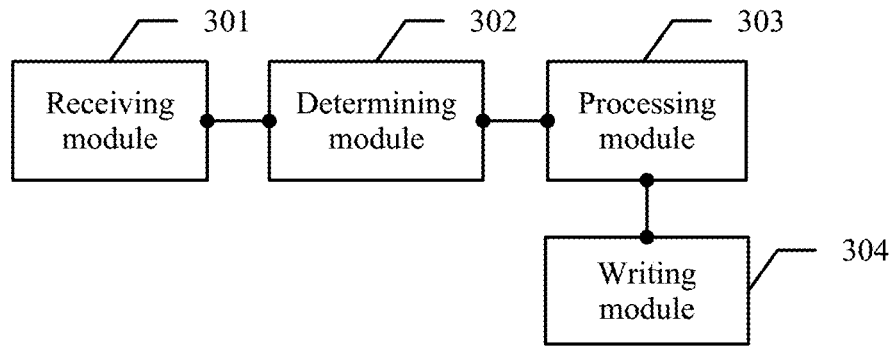
FIG. 3 is a schematic structural diagram of an image adjustment apparatus according to an embodiment of the present invention.

The foregoing describes the display mura correction method in the embodiments of the present invention in detail, and the following describes an embodiment of an image adjustment apparatus in the embodiments of the present invention. The apparatus may be applied to the field of image processing. Referring to FIG. 3, this embodiment of the present invention includes:

a receiving module 301, configured to receive initial image data of an initial image displayed on a display of a terminal, where the initial image data includes image data of a mura region corresponding to the initial image, and when at least one pixel whose brightness value is not in a reference threshold set exists in the initial image data, the mura region is a region that is covered by the at least one pixel on the display;

a determining module 302, configured to determine a target feature data set of the mura region according to the initial image data received by the receiving module 301, where the target feature data set includes a set of target feature data of the at least one pixel;

a processing module 303, configured to obtain, according to a correspondence between feature data and a correction value and the target feature data that is of the at least one pixel and is determined by the determining module 302, a target correction value set corresponding to the target feature data set, where the target correction value set includes a target correction value set corresponding to the at least one pixel in the mura region; and a writing module 304, configured to write the target correction value set obtained by the processing module 303 into the terminal, so that the terminal corrects the mura region according to the target correction value set.

In this embodiment of the present invention, after a determining module 302 determines, according to initial image data obtained by a receiving module 301, a target feature data set corresponding to a mura region, a processing module 303 obtains, according to a correspondence between feature data and a correction value, a target correction value set corresponding to the target feature data set, thereby improving correction value accuracy; and a writing module 304 writes the target correction value set into the terminal, so that the terminal corrects the mura region according to the target correction value set. In this embodiment of the present invention, mura correction can be completed directly by using a built-in image processing module of the terminal, without a need of an external peripheral compensation system, thereby effectively lowering display mura correction difficulty, improving integration of a compensation system, lowering production costs, and improving portability and implementability.

Figure 4:
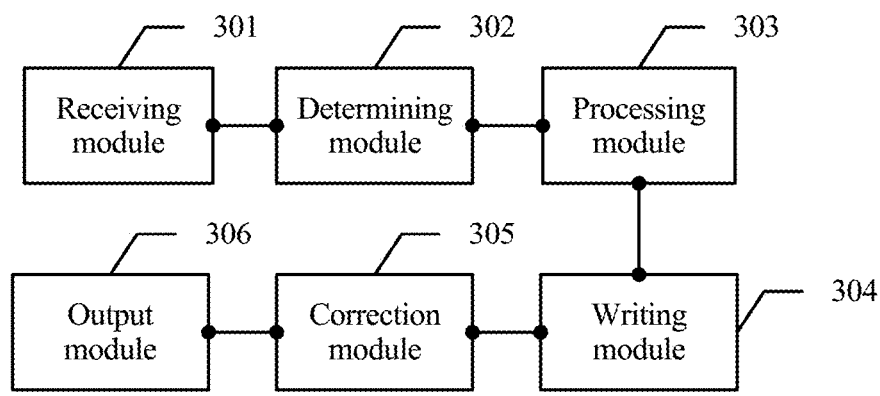
FIG. 4 is another schematic structural diagram of an image adjustment apparatus according to an embodiment of the present invention.

Optionally, on the basis of the embodiment corresponding to FIG. 3, referring to FIG. 4, in a first optional embodiment of the embodiments of the present invention, the image adjustment apparatus in this embodiment of the present invention further includes:

a correction module 305, configured to correct the mura region according to the target correction value set written by the writing module 304, to obtain target image data; and an output module 306, configured to output a target image corresponding to the target image data obtained by means of correction by the correction module 305.

Optionally, on the basis of the first optional embodiment, referring to FIG. 5, in a second optional embodiment of the embodiments of the present invention, there are multiple LUTs, and the apparatus further includes:

an updating module 307, configured to: after preset duration, determine, according to a current brightness attenuation value of the display, a target LUT corresponding to the brightness attenuation value, and update a currently used LUT to the target LUT, where the LUT and the brightness attenuation value are in a one-to-one correspondence.

Figure 6:
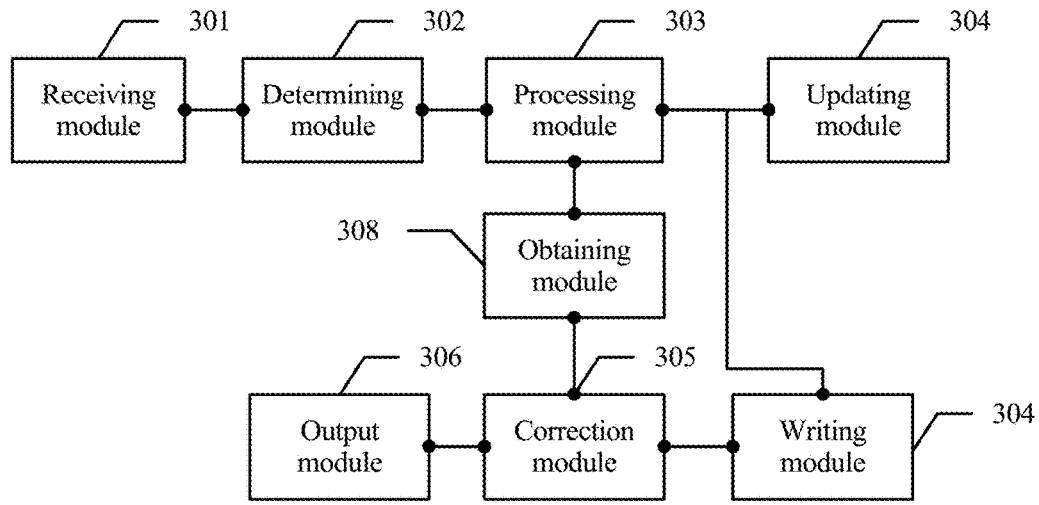
FIG. 6 is another schematic structural diagram of an image adjustment apparatus according to an embodiment of the present invention.

Optionally, on the basis of the embodiment corresponding to FIG. 3, and the first or the second optional embodiment, referring to FIG. 6, in a third optional embodiment of the embodiments of the present invention, the apparatus further includes:

an obtaining module 308, configured to obtain the mura region of the initial image data, where the mura region of the initial image data includes multiple target mura regions.

The processing module 303 is specifically configured to obtain a target correction value corresponding to each of the multiple target mura regions from the LUT, to obtain the target correction value set.

The obtaining module 308 is further configured to obtain a priority of each of the multiple target mura regions.

The correction module 305 is specifically configured to correct a pixel in each mura region in descending order of the priorities obtained by the obtaining module 308.

Figure 7:
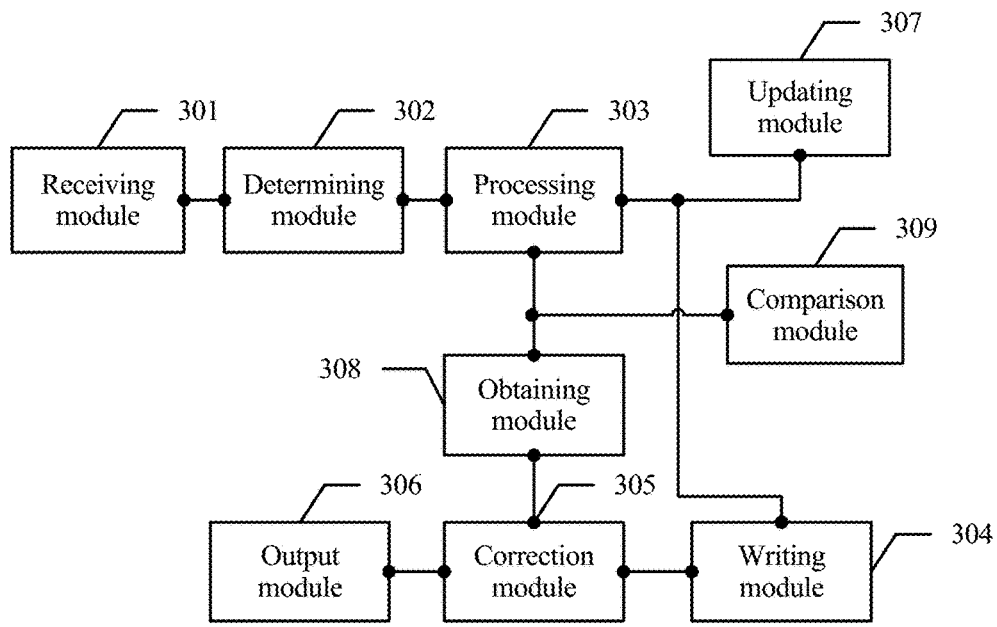
FIG. 7 is another schematic structural diagram of an image adjustment apparatus according to an embodiment of the present invention.

Optionally, on the basis of the embodiment corresponding to FIG. 3, and the first to the third optional embodiments, referring to FIG. 7, in a fourth optional embodiment of the embodiments of the present invention, the obtaining module 308 is further configured to:

obtain a target grayscale coefficient of the mura region that has undergone compensation processing.

The apparatus further includes:

a comparison module 309, configured to compare the target grayscale coefficient with a preset grayscale coefficient of a normal region to obtain a comparison result.

The processing module 303 is further configured to: when it is determined that the comparison result obtained by the comparison module 309 does not meet a preset correction acceptance condition, repeat a correction process until the preset correction acceptance condition is met, and write a correction value set obtained when the correction acceptance condition is met into the terminal to update the target correction value set.

Optionally, on the basis of the embodiment corresponding to FIG. 3, and the first to the fourth optional embodiments, in a fifth optional embodiment of the embodiments of the present invention, the processing module 303 is further configured to:

determine, according to the LUT, a numerical interval corresponding to each mura region; and select, according to a preset selection policy, the target correction value corresponding to each mura region.

The preset selection policy may include a preset lower-limit selection policy or a preset closeness-based selection policy.

When the target correction value is being selected, the target correction value corresponding to each mura region may be selected according to the preset lower-limit selection policy. For example, when the LUT is a matrix, a numerical interval within which pixel data corresponding to each mura region falls is determined first; then, target image data, that is, closest image data, that is corresponding to the pixel data and that is in the LUT table is determined according to the lower-limit selection policy; and the target correction value corresponding to the mura is determined. For example, $M_{n-1} < M_x < M_n$, and provided that $M_x$ falls within $[M_{n-1}, M_n]$, $C_{n-1}$ corresponding to $M_{n-1}$ is selected.

Alternatively, the target correction value corresponding to each mura region may be selected according to the preset closeness-based selection policy. For example, $M_{n-1} < M_x < M_n$. If a value of $M_x$ is close to $M_n$, $C_n$ corresponding to $M_n$ is selected; or if a value of $M_x$ is close to $M_{n-1}$, $C_{n-1}$ corresponding to $M_{n-1}$ is selected.

Figure 9:
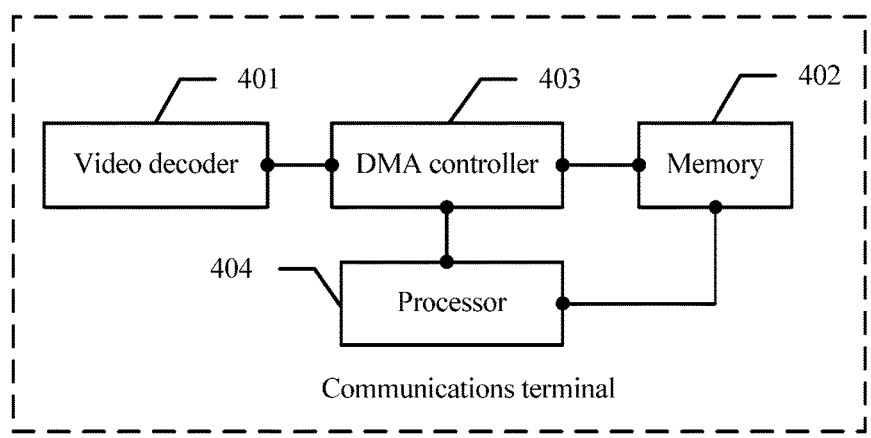
FIG. 9 is a schematic structural diagram of a communications terminal according to an embodiment of the present invention.

Referring to FIG. 9, the following describes a communications terminal in an embodiment of the present invention. In this embodiment, the communications terminal includes but is not limited to a display device such as a mobile phone, a terminal, a personal digital assistant (Personal Digital Assistant, PDA), or a tablet computer. This embodiment of the present invention includes:

a video decoder 401, a memory 402, a direct memory access DMA controller 403, and a processor 404.

The video decoder 401 is configured to decode initial image data input into the communications terminal. The initial image data includes image data of a mura region, and when at least one pixel whose brightness value is not in a reference threshold set exists in the initial image data, the mura region is a region that is covered by the at least one pixel on the display.

The memory 402 is configured to store a correspondence between feature data and a correction value.

The DMA controller 403 is configured to: in a phase in which the video decoder 401 decodes the initial image data, when the processor 404 sends a query request to the DMA controller so as to correct the mura region, send data including the correspondence obtained from the memory 402 to the processor 404, where the query request is a request for querying a target correction value set corresponding to the target feature data set.

The processor 404 is configured to: determine the target feature data set of the mura region according to the initial image data obtained by means of decoding by the video decoder 401, where the target feature data set includes a set of target feature data of the at least one pixel; obtain, according to the correspondence sent by the DMA controller, the target correction value set corresponding to the target feature data set; and write the target correction value set into the memory 402, so as to correct the mura region according to the target correction value set.

The processor 404 is further configured to: after correcting the mura region according to the target correction value set, obtain target image data, and output a target image corresponding to the target image data.

In this embodiment of the present invention, a DMA controller 403 sends data including the correspondence obtained from the memory 402 to the processor 404, so that the processor 404 obtains, according to the correspondence, a target correction value set corresponding to the target feature data set, corrects the mura region according to the target correction value set, and outputs a target image obtained by means of correction, thereby effectively lowering display mura correction difficulty.

Optionally, on the basis of the embodiment corresponding to FIG. 9, in a first optional embodiment of the embodiments of the present invention, there are multiple LUTs, and the processor 404 is further configured to:

after preset duration, determine, according to a current brightness attenuation value of the display, a target LUT corresponding to the brightness attenuation value, and update an LUT currently stored in the memory to the target LUT, where the LUT and the brightness attenuation value are in a one-to-one correspondence.

Figure 8:
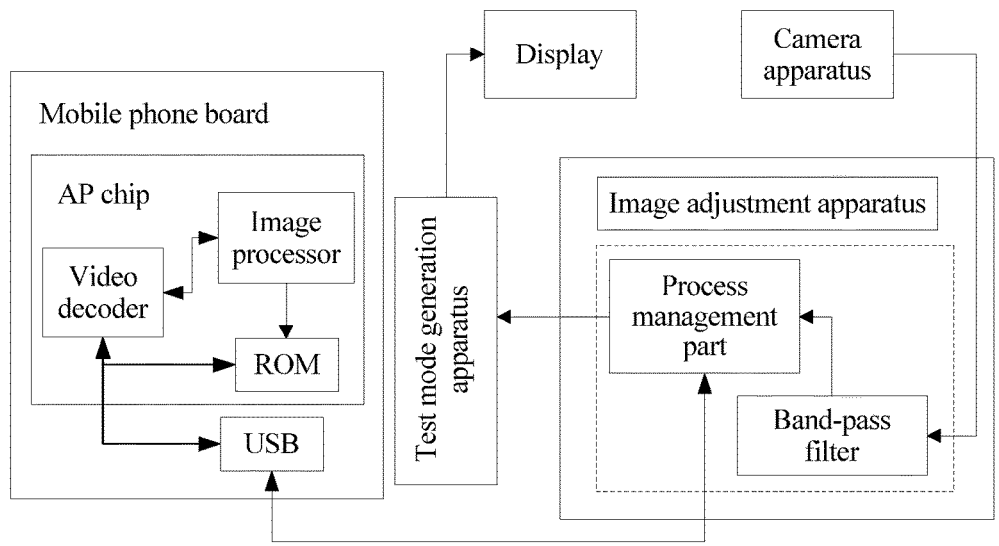
FIG. 8 is a schematic structural diagram of a display mura correction system according to an embodiment of the present invention.
Figure 10:
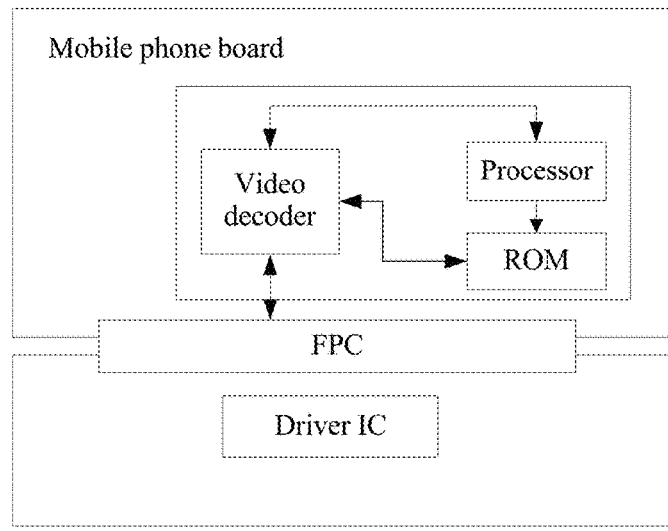
FIG. 10 is another schematic structural diagram of a communications terminal according to an embodiment of the present invention.

In an actual application, the memory 402 may be a read only memory (ROM, Read Only Memory). As shown in FIG. 10, an AP chip is usually built in the communications terminal, and the LUT is preset in the AP chip, so that when the AP chip executes an image enhancement algorithm and an edge sharpening algorithm, a mura correction value is implanted into a memory of the AP chip and is easy to be invoked during correction. In this embodiment, the processor may be specifically an image processing module built in the AP chip. In a specific application, for a structure of a display mura correction system, reference may be made to FIG. 8.

Optionally, on the basis of the embodiment corresponding to FIG. 9 and the first optional embodiment, in a second optional embodiment of the embodiments of the present invention, when the mura region includes multiple target mura regions, the processor 404 is specifically configured to:

perform a query in the LUT to obtain a target correction value corresponding to each of the multiple target mura regions, to obtain the target correction value set; and after a priority of each of the multiple target mura regions is determined, correct a pixel in each mura region in descending order of the priorities by using the target correction value set.

It may be understood that a mura region can be corrected by region, so as to improve a correction effect, reduce a quantity of correction times and a correction time, and improve mura correction accuracy.

Figure 13:
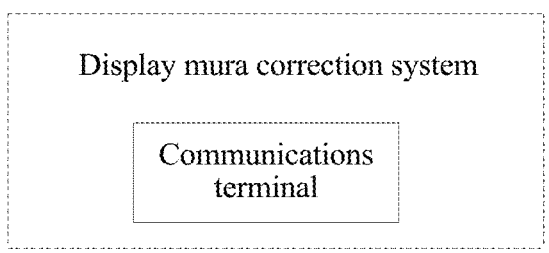
FIG. 13 is another schematic structural diagram of a display mura correction system according to an embodiment of the present invention.

The foregoing describes the display mura correction method and the apparatus in the embodiments of the present invention in detail, and the following describes an embodiment of a display mura correction system in the embodiments of the present invention. The system may be applied to the field of various display technologies. Referring to FIG. 13, this embodiment of the present invention includes:

the communications terminal according to any one of the embodiment corresponding to FIG. 9, or the first or the second optional embodiment.

FIG. 14 is another schematic structural diagram of an image adjustment apparatus 140 according to an embodiment of the present invention. The image adjustment apparatus 140 may include at least one input unit 1401, at least one display unit 1402, at least one processor 1403, a memory 1404, and an RF circuit 1405, so as to implement a connection and communication between the apparatuses. A communication connection between the apparatus and at least one other apparatus is implemented by using at least one communications interface (which may be wired or wireless). The Internet, a wide area network, a local area network, a metropolitan area network, and the like may be used.

The input unit 1401 is configured to input initial image data of an initial image of a display of a terminal into the processor 1403 of the terminal.

The memory 1404 may include a read only memory and a random access memory, and provides an instruction and data for the processor 1403. A part of the memory 1404 may further include a high-speed random access memory (RAM, Random Access Memory), and may further include a non-volatile memory (non-volatile memory).

The memory 1404 is configured to store a correspondence between feature data and a correction value, and also stores the following elements, an executable module or a data structure, or a subset or an extended set thereof:

an operation instruction, including various operation instructions and used for implementing various operations; and an operating system, including various system programs and used for implementing various basic services and processing a hardware-based task.

The display unit 1402 is configured to display a target image corrected by the processor 1403.

The RF circuit 1405 is mainly configured to establish communication between the terminal and a wireless network (that is, a network side), so as to implement data receiving and sending between the terminal and the wireless network, for example, receiving and sending of an SMS message and an e-mail. Specifically, the RF circuit 1405 receives and sends an RF signal. The RF signal is also referred to as an electromagnetic signal. The RF circuit 1405 converts an electrical signal into an electromagnetic signal, or converts an electromagnetic signal into an electrical signal, and communicates with a communications network and another device by using the electromagnetic signal. The RF circuit 1405 may include a known circuit for executing the functions, and includes but is not limited to an antenna system, an RF transceiver, one or more amplifiers, a tuner, one or more oscillators, a digital signal processor, a CODEC chipset, and a subscriber identity module (Subscriber Identity Module, SIM).

In this embodiment of the present invention, the processor 1403 performs the following operations by invoking the operation instruction (the operation instruction may be stored in the operating system) stored in the memory 1404:

receiving the initial image data of the initial image displayed on the display of the terminal, where the initial image data includes image data of a mura region corresponding to the initial image, and when at least one pixel whose brightness value is not in a reference threshold set exists in the initial image data, the mura region is a region that is covered by the at least one pixel on the display;

determining a target feature data set of the mura region, where the target feature data set includes a set of target feature data of the at least one pixel;

obtaining, according to the correspondence between feature data and a correction value and the target feature data of the at least one pixel, a target correction value set corresponding to the target feature data set; and writing the target correction value set into the terminal, so that the terminal corrects the mura region according to the target correction value set.

After the target correction value set is written into the terminal, the processor 1403 is further configured to perform the following operations: correcting the mura region according to the target correction value set, to obtain target image data, and outputting, by using the display unit 1402, a target image corresponding to the target image data.

In some implementation manners, the correspondence is look up tables LUTs that include correspondence sets between n groups of feature data and correction values, where n is a positive integer greater than 1. The mura region includes multiple target mura regions. The processor 1403 is specifically configured to perform the following steps:

obtaining a target correction value corresponding to each of the multiple target mura regions from the LUT, to obtain the target correction value set; and writing the target correction value set into the terminal, so that after determining a priority of each of the multiple target mura regions, the terminal corrects a pixel in each mura region in descending order of the priorities according to the target correction value set, to obtain corrected target image data.

In some implementation manners, after writing the target correction value set into the terminal, the processor 1403 may be further configured to perform the following steps:

after preset duration, determining, according to a current brightness attenuation value of the display, a target LUT corresponding to the brightness attenuation value, and updating a currently used LUT to the target LUT, where the LUT and the brightness attenuation value are in a one-to-one correspondence.

In some implementation manners, after writing the target correction value set into the terminal, the processor 1403 may be further configured to perform the following steps:

obtaining a target grayscale coefficient of the mura region that has undergone compensation processing;

comparing the target grayscale coefficient with a preset grayscale coefficient of a normal region to obtain a comparison result; and when it is determined that the comparison result does not meet a preset correction acceptance condition, repeating a correction process until the preset correction acceptance condition is met, and writing a correction value set obtained when the correction acceptance condition is met into the terminal to update the target correction value set.

In some implementation manners, the processor 1403 may be specifically further configured to perform the following steps:

determining, according to the LUT, a numerical interval corresponding to each mura region, and selecting, according to a preset selection policy, the target correction value corresponding to each mura region, to obtain the target correction value set.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The storage medium includes: any medium that can store program code, such as a USB flash drive, a removable hard disk, a ROM, a random access memory (RAM, Random Access Memory), a magnetic disk, or an optical disc.

The display mura correction method and the apparatus provided in the present invention are described in detail above. The principle and implementation manner of the present invention are described in the specification by using specific embodiments. The description about the embodiments is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A method of correcting a display mura, the method comprising:
   receiving, by a terminal, initial image data for displaying an initial image, wherein the initial image data comprises image data of a mura located in a region of the initial image when displayed, and wherein when the mura is located within the region, the region has at least one pixel with a brightness value that is not within a reference threshold set;
   determining, by the terminal, a target feature data set of the at least one pixel according to a brightness value of the at least one pixel from the initial image data;
   obtaining, by the terminal and according to a correspondence between feature data, a correction value, and the target feature data set, a target correction value set; and
   generating, by the terminal, target image data based on the initial image data and the target correction value set, wherein the target image data is for displaying the initial image with a corrected mura within the region.

2. A method of correcting a display mura, the method comprising:
   receiving, by a terminal, initial image data of an initial image displayed on a display of the terminal, wherein the initial image data comprises image data of a mura region corresponding to the initial image, and when at least one pixel whose brightness value is not in a reference threshold set exists in the initial image data, the mura region is a region that is covered by the at least one pixel on the display;
   determining, by the terminal, a target feature data set of the mura region, wherein the target feature data set comprises a set of target feature data of the at least one pixel;
   obtaining, by the terminal according to a correspondence between feature data and a correction value and the target feature data of the at least one pixel, a target correction value set corresponding to the target feature data set;
   writing, by the terminal, the target correction value set into the terminal, so that the terminal corrects the mura region according to the target correction value set;
   wherein the correspondence comprises multiple look up tables (LUTs), the LUTs are correspondences comprising one or more groups of feature data and correction values; and
   after writing, by the terminal, the target correction value set into the terminal:
      after a preset duration, determining, by the terminal according to a current brightness attenuation value of the display, a target LUT corresponding to a brightness attenuation value, and
      updating, by the terminal, a currently used LUT to the target LUT, wherein the target LUT and the brightness attenuation value are in a one-to-one correspondence.

3. The method according to claim 2, wherein:
   the mura region comprises multiple target mura regions; and
   obtaining, by the terminal according to a correspondence between feature data and a correction value and the target feature data set of the at least one pixel, a target correction value set corresponding to the target feature data set, and the writing, by the terminal, the target correction value set into the terminal comprise:
      obtaining, by the terminal, a target correction value set corresponding to each of the multiple target mura regions from the target LUT, to obtain the target correction value set, and
      writing, by the terminal, the target correction value set into the terminal, so that after determining a priority of each of the multiple target mura regions, the terminal corrects a pixel in each mura region in descending order of the priorities according to the target correction value set, to obtain corrected target image data.

4. The method according to claim 3, wherein obtaining, by the terminal, a target correction value set corresponding to each of the multiple target mura regions from the target LUT, to obtain the target correction value set comprises:
   determining, by the terminal and according to the target LUT, a numerical interval corresponding to each mura region, and
   selecting, by the terminal and according to a preset selection policy, the target correction value set corresponding to each mura region, to obtain the target correction value set.

5. A method of correcting a display mura, the method comprising:
   receiving, by a terminal, initial image data of an initial image displayed on a display of the terminal, wherein the initial image data comprises image data of a mura region corresponding to the initial image, and when at least one pixel whose brightness value is not in a reference threshold set exists in the initial image data, the mura region is a region that is covered by the at least one pixel on the display;
   determining, by the terminal, a target feature data set of the mura region, wherein the target feature data set comprises a set of target feature data of the at least one pixel;
   obtaining, by the terminal according to a correspondence between feature data and a correction value and the target feature data of the at least one pixel, a target correction value set corresponding to the target feature data set;
   writing, by the terminal, the target correction value set into the terminal, so that the terminal corrects the mura region according to the target correction value set;
   after the terminal writes the target correction value set into the terminal:
      obtaining, by the terminal, a target grayscale coefficient of the mura region that has undergone compensation processing;
      comparing, by the terminal, the target grayscale coefficient with a preset grayscale coefficient of a normal region of the initial image to obtain a comparison result; and
      when the comparison result does not meet a preset correction acceptance condition, repeating, by the terminal, a correction process until the preset correction acceptance condition is met, and writing, by the terminal a correction value set obtained when a correction acceptance condition is met into the terminal to update the target correction value set.

6. A terminal comprising:
a memory configured to store feature data and associated correction values;
a video decoder configured to receive initial image data for displaying an initial image, wherein the initial image data comprises image data of a mura located in a region of the initial image when displayed, and wherein when the mura is located within the region, the region has at least one pixel with a brightness value that is not within a reference threshold set;
a direct memory access (DMA) controller configured to:
in a phase in which the video decoder decodes the initial image data, when a processor sends a query request to the DMA controller so as to correct the mura, send data comprising a correspondence obtained from the memory to the processor, wherein the query request is a request for querying a target correction value set corresponding to a target feature data set of the mura; and
wherein the processor is configured to:
determine a target feature data set of the at least one pixel according to a brightness value of the at least one pixel from the initial image data,
obtain, according to a correspondence between feature data stored in the memory, a correction value stored in the memory, and the target feature data set, a target correction value set, and
generate target image data based on the initial image data and the target correction value set, wherein the target image data is for displaying the initial image with a corrected mura within the region.

7. A communications terminal comprising:
a video decoder configured to decode initial image data input into the communications terminal, wherein the initial image data comprises image data of a mura region, and when at least one pixel whose brightness value is not in a reference threshold set exists in the initial image data, the mura region is a region that is covered by the at least one pixel on a display;
a memory configured to store a correspondence between feature data and a correction value;
a direct memory access (DMA) controller configured to:
in a phase in which the video decoder decodes the initial image data, when a processor sends a query request to the DMA controller so as to correct the mura region, send data comprising the correspondence obtained from the memory to the processor, wherein the query request is a request for querying a target correction value set corresponding to a target feature data set of the mura region; and
wherein the processor is configured to:
determine the target feature data set of the mura region according to the initial image data obtained by means of decoding by the video decoder, wherein the target feature data set comprises a set of target feature data of the at least one pixel,
obtain, according to the correspondence sent by the DMA controller and the target feature data of the at least one pixel, the target correction value set corresponding to the target feature data set, and
write the target correction value set into the memory, so as to correct the mura region according to the target correction value set;
wherein the correspondence comprises multiple look up tables (LUTs) that comprise correspondences between one or more groups of feature data and correction values;
wherein after the processor writes the target correction value set into the communications terminal, the processor is configured to:
after a preset duration, determine, according to a current brightness attenuation value of the display, a target LUT corresponding to a brightness attenuation value,
update a LUT currently stored in the memory to the target LUT, wherein the target LUT and the brightness attenuation value are in a one-to-one correspondence.

8. The communications terminal according to claim 7, wherein the processor is configured to:
when the mura region comprises multiple target mura regions, perform a query in the LUT to obtain a target correction value corresponding to each of the multiple target mura regions, to obtain the target correction value set; and
after a priority of each of the multiple target mura regions is determined, correct a pixel in each mura region in descending order of the priorities by using the target correction value set.

9. A non-transitory, computer-readable storage medium storing one or more computer executable instructions that, when executed by at least one processor, cause the at least one processor to:
receive initial image data for displaying an initial image, wherein the initial image data comprises image data of a mura located within a region of the initial image when displayed, and wherein when the mura is located within the region, the region has at least one pixel with a brightness value that is not within a reference threshold set;
determine a target feature data set the at least one pixel according to a brightness value of the at least one pixel from the initial image data;
obtain a target correction value set according to a correspondence between feature data a correction value, and the target feature data set; and
generate target image data based on the initial image data and the target correction value set, wherein the target image data is for displaying the initial image with a corrected mura within the region.

10. A computer program product comprising a non-transitory, computer-readable medium storing computer executable instructions that, when executed by a processor, instruct the processor to:
receive initial image data of an initial image displayed on a display of a terminal, wherein the initial image data comprises image data of a mura region corresponding to the initial image, and when at least one pixel whose brightness value is not in a reference threshold set exists in the initial image data, the mura region is a region that is covered by the at least one pixel on the display;
determine a target feature data set of the mura region, wherein the target feature data set comprises a set of target feature data of the at least one pixel;
obtain a target correction value set corresponding to the target feature data set according to a correspondence between feature data and a correction value and the target feature data of the at least one pixel; and write the target correction value set into the terminal, so that the terminal corrects the mura region according to the target correction value set;

the correspondence comprises multiple look up tables (LUTs), the LUTs are correspondences comprising n groups of feature data and correction values, wherein n is a positive integer greater than 1; and after writing the target correction value set into the terminal, the computer executable instructions, when executed by the processor, further instruct the processor to:

after a preset duration, determine a target LUT corresponding to a brightness attenuation value according to a current brightness attenuation value of the display, and update a currently used LUT to the target LUT, wherein the target LUT and the brightness attenuation value are in a one-to-one correspondence.

11. The computer program product according to claim 10, wherein:

the mura region comprises multiple target mura regions, and obtaining a target correction value set corresponding to the target feature data set according to a correspondence between feature data and a correction value and the target feature data of the at least one pixel; and to write the target correction value set into the terminal, the computer executable instructions, when executed by the processor, instruct the processor to:

obtain a target correction value corresponding to each of the multiple target mura regions from the target LUT, to obtain the target correction value set; and write the target correction value set into the terminal to enable after determining a priority of each of the multiple target mura regions, the terminal corrects a pixel in each mura region in a descending order of the priorities according to the target correction value set, to obtain corrected target image data.

12. The computer program product according to claim 11, wherein obtaining a target correction value corresponding to each of the multiple target mura regions from the target LUT, to obtain the target correction value set comprises:

determining, according to the target LUT, a numerical interval corresponding to each mura region, and selecting, according to a preset selection policy, the target correction value corresponding to each mura region, to obtain the target correction value set.

13. A computer program product comprising a non-transitory, computer-readable medium storing computer executable instructions that, when executed by a processor, instruct the processor to:

receive initial image data of an initial image displayed on a display of a terminal, wherein the initial image data comprises image data of a mura region corresponding to the initial image, and when at least one pixel whose brightness value is not in a reference threshold set exists in the initial image data, the mura region is a region that is covered by the at least one pixel on the display;

determine a target feature data set of the mura region, wherein the target feature data set comprises a set of target feature data of the at least one pixel;

obtain a target correction value set corresponding to the target feature data set according to a correspondence between feature data and a correction value and the target feature data of the at least one pixel;

write the target correction value set into the terminal, so that the terminal corrects the mura region according to the target correction value set;

obtain a target grayscale coefficient of the mura region that has undergone compensation processing;

compare the target grayscale coefficient with a preset grayscale coefficient of a normal region to obtain a comparison result;

when the comparison result does not meet a preset correction acceptance condition, repeat a correction process until the preset correction acceptance condition is met; and write a correction value set obtained when a correction acceptance condition is met into the terminal to update the target correction value set.

* * * * *